US009430642B2

(12) United States Patent
Hepkin et al.

(10) Patent No.: US 9,430,642 B2
(45) Date of Patent: Aug. 30, 2016

(54) PROVIDING VIRTUAL SECURE MODE WITH DIFFERENT VIRTUAL TRUST LEVELS EACH HAVING SEPARATE MEMORY ACCESS PROTECTIONS, INTERRUPT SUBSYSTEMS AND PRIVATE PROCESSOR STATES

(71) Applicant: Microsoft Technology Licensing, LLC, Redmond, WA (US)

(72) Inventors: David A. Hepkin, Redmond, WA (US); Arun U. Kishan, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 244 days.

(21) Appl. No.: 14/186,415

(22) Filed: Feb. 21, 2014

(65) Prior Publication Data

US 2015/0082305 A1    Mar. 19, 2015

Related U.S. Application Data

(60) Provisional application No. 61/879,072, filed on Sep. 17, 2013.

(51) Int. Cl.
*G06F 21/53* (2013.01)
*G06F 9/455* (2006.01)

(52) U.S. Cl.
CPC ........... *G06F 21/53* (2013.01); *G06F 9/45558* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 5,596,755 A * | 1/1997 | Pletcher | ............... | G06F 9/4812 710/261 |
| 6,397,242 B1 * | 5/2002 | Devine | ............... | G06F 9/45533 703/27 |
| 7,278,030 B1 * | 10/2007 | Chen | ................... | G06F 12/1466 711/200 |
| 7,409,487 B1 * | 8/2008 | Chen | ................... | G06F 12/1036 711/209 |
| 7,506,096 B1 * | 3/2009 | Koryakin | .............. | G06F 12/109 711/202 |
| 8,490,085 B2 * | 7/2013 | Devaux | ............... | G06F 12/1491 712/220 |
| 2006/0123416 A1 * | 6/2006 | Cibrario Bertolotti | ............ | G06F 9/45533 718/1 |
| 2006/0294519 A1 * | 12/2006 | Hattori | ................ | G06F 9/45558 718/1 |
| 2009/0172328 A1 | 7/2009 | Sahita et al. | | |
| 2009/0187904 A1 * | 7/2009 | Serebrin | ............. | G06F 9/45537 718/1 |
| 2010/0042980 A1 * | 2/2010 | Wright | .................. | G06F 8/4443 717/146 |

(Continued)

OTHER PUBLICATIONS

"Second Written Opinion Issued in PCT Application No. PCT/US2014/055292", Mailed Date: Jul. 27, 2015, 5 Pages.

(Continued)

*Primary Examiner* — Benjamin Wu
(74) *Attorney, Agent, or Firm* — Timothy Churna; Judy Yee; Micky Minhas

(57) ABSTRACT

A virtual machine manager (e.g., hypervisor) implements a virtual secure mode that makes multiple different virtual trust levels available to virtual processors of a virtual machine. Different memory access protections (such as the ability to read, write, and/or execute memory) can be associated with different portions of memory (e.g., memory pages) for each virtual trust level. The virtual trust levels are organized as a hierarchy with a higher level virtual trust level being more privileged than a lower virtual trust level, and programs running in the higher virtual trust level being able to change memory access protections of a lower virtual trust level. The number of virtual trust levels can vary, and can vary for different virtual machines as well as for different virtual processors in the same virtual machine.

20 Claims, 6 Drawing Sheets

(56) References Cited

U.S. PATENT DOCUMENTS

| | | | |
|---|---|---|---|
| 2010/0042983 A1* | 2/2010 | Vick ................... | G06F 9/45516 717/153 |
| 2010/0162238 A1 | 6/2010 | Warfield | |
| 2010/0306766 A1* | 12/2010 | Schneider ........... | G06F 9/45533 718/1 |
| 2014/0230077 A1* | 8/2014 | Muff ................... | G06F 9/45533 726/30 |

OTHER PUBLICATIONS

"International Search Report and Written Opinion", Application No. PCT/US2014/055292, Dec. 5, 2014, 7 pages.
"Hypervisor Top-Level Functional Specification: Windows Server 2012", Aug. 8, 2012, 392 Pages.
Gattupalli, "Using Virtualization to Implement a Scalable Trusted Execution Environment in Secure SoCs", Retrieved from: <http://www.edn.com/design/systems-design/4402964/3/Using-virtualization-to-implement-a-scalable-trusted-execution-environment-in-secure-SoCs> on Sep. 23, 2013, Dec. 7, 2012, 3 pages.
Goodacre, "Hardware Accelerated Virtualization in the ARM Cortex™ Processors", Available at <http://www-archive.xenproject.org/files/xensummit_seoul11/nov2/2_XSAsia11_JGoodacre_HW_accelerated_virtualization_in_the_ARM_Cortex_processors.pdf>, Nov. 2, 2010, 30 pages.
Jin, et al.,' "Architectural Support for Secure Virtualization under a Vulnerable Hypervisor", In Proceedings of the 44th Annual IEEE/ACM International Symposium on Microarchitecture, Dec. 3, 2011, pp. 272-283.
Li, et al.,' "Secure Virtual Machine Execution under an Untrusted Management OS", In IEEE 3rd International Conference on Cloud Computing, Jul. 6, 2010, pp. 172-179.
Szefer, et al.,' "Architectural Support for Hypervisor-Secure Virtualization", In Proceedings of the International Conference on Architectural Support for Programming Language and Operating Systems, Mar. 2012, pp. 1-13.
Yang, et al.,' "Using Hypervisor to Provide Data Secrecy for User Applications on a Per-Page Basis", In Proceedings of the Fourth ACM SIGPLAN/SIGOPS International Conference on Virtual Execution Environments, Jun. 5, 2008, 10 pages.
International Preliminary Report on Patentability Issued in PCT Application No. PCT/US2014/055292, Mailed Date: Jan. 11, 2016, 7 Pages.

* cited by examiner

PROVIDING VIRTUAL SECURE MODE WITH DIFFERENT VIRTUAL TRUST LEVELS EACH HAVING SEPARATE MEMORY ACCESS PROTECTIONS, INTERRUPT SUBSYSTEMS AND PRIVATE PROCESSOR STATES

RELATED APPLICATIONS

This application claims priority to U.S. Provisional Application No. 61/879,072, filed Sep. 17, 2013, entitled "Virtual Secure Mode", to David A. Hepkin, et al., the entire disclosure of which is hereby incorporated by reference herein in its entirety.

BACKGROUND

As computing technology has advanced, computing devices have become increasingly interconnected. While this interconnection provides many benefits, it is not without its problems. One such problem is that computing devices are increasingly exposed to malicious programs. Malicious programs can operate in different ways, such as by stealing information from a computing device, disabling a computing device, using a computing device to launch attacks against other computing devices, and so forth. Although some techniques have been developed to protect computing devices against malicious programs, such malicious programs remain and can lead to frustrating user experiences when they infect a user's computer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a virtual secure mode is implemented for a virtual machine, the virtual secure mode having multiple virtual trust levels. The multiple virtual trust levels are organized as a hierarchy so that a higher level virtual trust level is more privileged than a lower virtual trust level. A virtual processor of the virtual machine is allowed to run in any one of the multiple virtual trust levels, but the virtual processor runs in only one virtual trust level at a time, and the virtual trust level at which the virtual processor is running is the active virtual trust level. A virtual machine manager managing the virtual machine allows a program running on the virtual processor to access memory of the virtual machine based on memory access protections configured for the active virtual trust level.

In accordance with one or more aspects, a computing device has one or more processors, an operating system, and a virtual machine manager that implements a virtual secure mode having multiple virtual trust levels. The virtual machine manager allows, for each of one or more virtual processors, the virtual processor to access physical memory based on memory access protections configured for the one of the multiple virtual trust levels at which the virtual processor is running, the one of the multiple virtual trust levels at which the virtual processor is running being the active virtual trust level.

BRIEF DESCRIPTION OF THE DRAWINGS

The same numbers are used throughout the drawings to reference like features.

DETAILED DESCRIPTION

Virtual secure mode for virtual machines is discussed herein. A virtual machine manager implements a virtual secure mode that makes multiple different virtual trust levels available to virtual processors of a virtual machine. Different memory access protections, such as the ability to read, write, and/or execute memory, can be associated with different portions of memory (e.g., memory pages) for each virtual trust level. The virtual trust levels are organized as a hierarchy with a higher level virtual trust level being more privileged than a lower virtual trust level, and programs running in the higher virtual trust level being able to change memory access protections of a lower virtual trust level. The number of virtual trust levels can vary, and can vary for different virtual machines as well as for different virtual processors in the same virtual machine.

Figure 1:
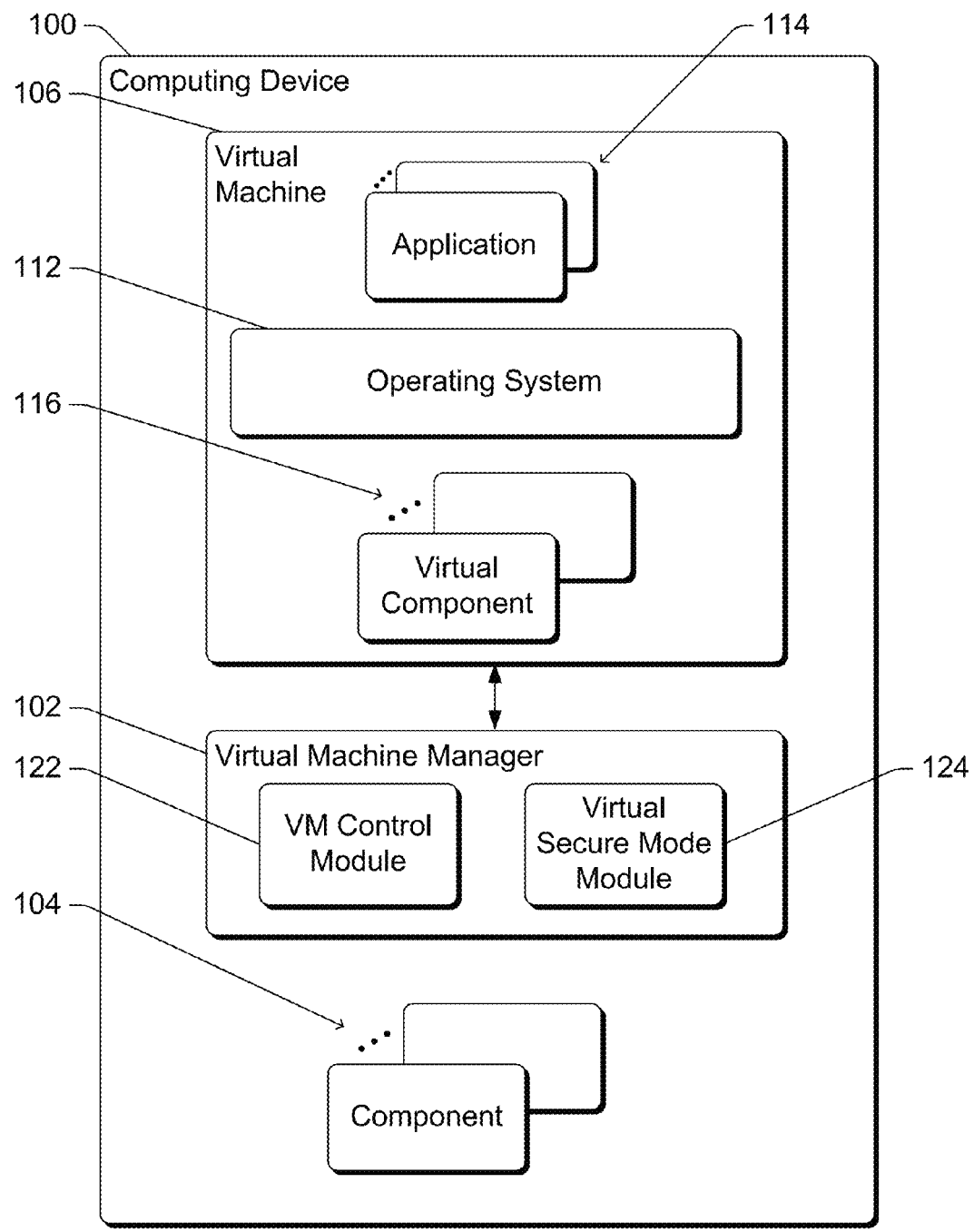
FIG. 1 is a block diagram illustrating an example computing device implementing the techniques discussed herein in accordance with one or more embodiments.

FIG. 1 is a block diagram illustrating an example computing device 100 implementing the techniques discussed herein in accordance with one or more embodiments. The computing device 100 can be any of a variety of different types of devices. For example, the computing device 100 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, a wearable computer, and so forth.

The computing device 100 includes a virtual machine manager 102, also referred to as a hypervisor, and one or more components 104. The virtual machine manager 102 manages access to the functionality provided by the components 104. Alternatively, the virtual machine manager 102 can run on a host operating system (not shown), in which case the host operating system manages access to the functionality provided by the components 104.

The components 104 can be a variety of different processor components, input/output (I/O) components, and/or other components or devices. For example, components 104 can include one or more processors or processor cores, one or more memory components (e.g., volatile and/or nonvolatile memory), one or more storage devices (e.g., optical and/or magnetic disks, Flash memory drives), one or more communication components (e.g., wired and/or wireless network adapters), combinations thereof, and so forth. Although illustrated as part of the computing device 100, one or more of the components 104 (e.g., one or more storage devices) can be implemented external to the computing device 100. Various components or modules running on the computing device 100, including the virtual machine manager 102, can access this functionality provided by the components 104 directly and/or indirectly via other components or modules.

The virtual machine manager 102 allows a virtual machine 106 to run on the computing device 100. A single virtual machine 106 is illustrated in the computing device 100, although alternatively multiple virtual machines can run on the computing device 100. A virtual machine refers to a software implementation of a physical computing device (or other machine or system) that can run programs analogous to a physical computing device. The virtual machine includes one or more virtual components that are similar to (but are software implementations of) the components 104. An operating system as well as other applications can execute using the virtual components as they would using the components 104, including running on virtual processors or virtual processor cores, accessing virtual memory, and so forth. The operating system and other applications executing in the virtual machine 106 need have no knowledge, and typically have no knowledge, that they are executing in a virtual machine.

Virtual machine 106 includes an operating system 112, one or more applications 114, and one or more virtual components 116. The operating system 112 runs or executes on one or more virtual processors or processor cores included as one or more of the components 116, and manages execution of the applications 114.

The virtual machine manager 102 includes a virtual machine (VM) control module 122 and a virtual secure mode (VSM) module 124. The virtual machine control module 122 manages the mapping of the virtual components 116 to the components 104, including scheduling of virtual processors or processor cores to execute on physical processors or processor cores. The virtual secure mode module 124 manages a virtual secure mode for the virtual machine 106, providing different virtual trust levels for the virtual components 116 as discussed in more detail below. The virtual trust level is an execution environment for a virtual processor, and each virtual processor can enter or exit a virtual trust level independent of any other virtual processors. Although illustrated as two separate modules, it should be noted that the functionality of the modules 122 and 124 can be combined into a single module (e.g., the functionality of the virtual secure mode module 124 can be included in the VM control module 122).

The virtual secure mode module 124 makes multiple different virtual trust levels (VTLs) available to virtual processors (one or more virtual components 116) of the virtual machine 106 when virtual secure mode is enabled for the virtual machine 106. The virtual secure mode can be enabled or disabled in different manners, such as in response requests from a program (e.g., a virtual secure mode loader) running on a virtual processor, in response to configuration settings of the virtual machine manager 102, in response to inputs provided by an administrator or user of the computing device 100, and so forth. The computing device 100 can optionally include multiple virtual machines, and virtual secure mode can be enabled or disabled for different virtual machines independently. Thus, at any given time virtual secure mode can be enabled for one or more virtual machines of the computing device 100, and disabled for one or more other virtual machines of the computing device 100.

The virtual machine manager 102 provides a mechanism by which the operating system 112 can detect the presence of support for the virtual secure mode, as well as other information about the virtual secure mode such as the number of virtual trust levels supported. As an example, the virtual machine manager 102 could report the presence of support for virtual secure mode and the number of virtual trust levels via a virtual register (e.g., via a CPUID leaf) that could be read by the operating system 112.

The operating system 112 and virtual machine manager 102 manage storage of and access to memory that is made up of multiple blocks or portions that are referred to as memory pages (or simply pages). The memory can be, for example, any type of CPU (Central Processing Unit) addressable memory, such as volatile memory (e.g., RAM) or nonvolatile memory (e.g., Flash memory). Different programs can be allocated memory pages, and these programs can be applications 114, programs of operating system 112, or other components or modules.

The operating system 112 and virtual machine manager 102 can allow different types of access to memory pages by a program, such as read access, write access, and execute access. If read access (also referred to as read permission) is given to a memory page, then the content of the memory page is allowed to be read (e.g., by a particular one or more programs). If write access (also referred to as write permission) is given to a memory page, then content is allowed to be written to the memory page (e.g., by a particular one or more programs). If execute access (also referred to as execute permission) is given to a memory page, code stored in (also referred to as stored on) the memory page is allowed to be executed.

The computing device 100 employs virtual memory, which is an address space that is mapped to another address space (e.g., physical memory). An application is assigned a virtual memory space in which the application code is executed and data is stored. A memory manager (e.g., of a processor) manages mapping the virtual memory addresses in the virtual memory space to addresses in the other memory space. When mapping virtual memory addresses from the virtual memory address space to another memory space, an address translation is performed. An address translation table is used to perform this mapping, and can be leveraged to implement the techniques discussed herein.

Figure 2:
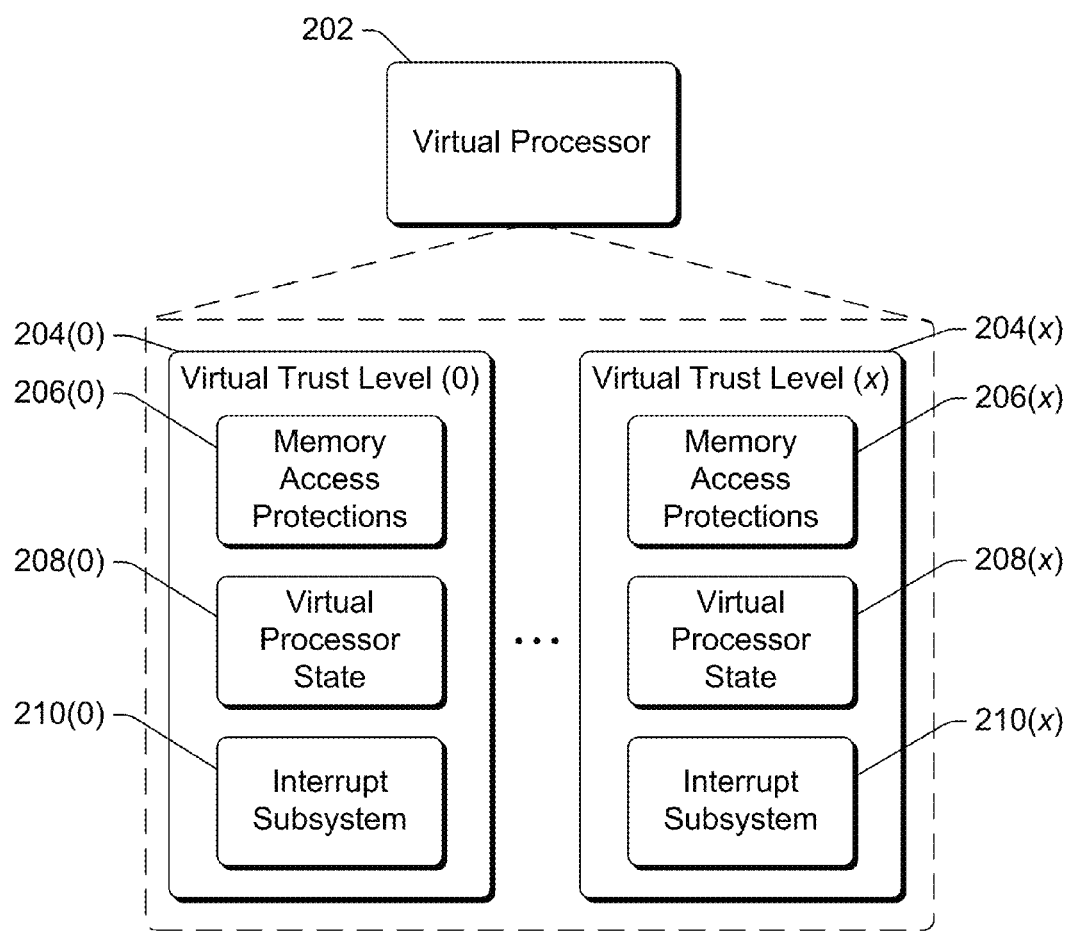
FIG. 2 illustrates an example of multiple virtual trust levels in accordance with one or more embodiments.

FIG. 2 illustrates an example of multiple virtual trust levels in accordance with one or more embodiments. A virtual processor 202, which can be a virtual component 116 of FIG. 1, can run in any number (x) of different virtual trust levels 204(0), . . . , 204(x). The virtual trust levels 204 are included as part of a virtual secure mode provided by the virtual secure mode module 124 of FIG. 1. In one or more embodiments, the virtual processor 202 can run in two different virtual trust levels, referred to as normal mode (e.g., VTL 0) and secure mode (e.g., VTL 1).

Each virtual trust level has associated with it a set of memory access protections 206. Different virtual trust levels can have different sets of access protections, and the set of access protections of a virtual trust level can be used to limit what memory can be accessed and/or how the memory can be accessed when the virtual processor is running in that virtual trust level.

Each virtual trust level also has associated with it a virtual processor state 208. The virtual processor state refers to various different register settings, configuration values, and so forth of the virtual processor 202. Separate virtual processor state 208 is maintained for different virtual trust levels, preventing one virtual trust level from accessing the processor state of another virtual trust level. Although some virtual processor state is maintained separately for different virtual trust levels (also referred to as private processor state), other processor state (also referred to as shared processor state) can be shared across multiple virtual trust levels as discussed in more detail below.

Each virtual trust level also has associated with it an interrupt subsystem 210. The interrupt subsystem refers to various different modules, programs, settings, and so forth for managing interrupts for the virtual processor 202. Separate interrupt subsystems 210 are maintained for different virtual trust levels, allowing interrupts to be managed securely at one virtual trust level while preventing programs running at another (e.g., lower as discussed in more detail below) virtual trust level from generating unexpected interrupts or masking interrupts.

The virtual trust levels are organized as a hierarchy with a higher level virtual trust level being more privileged than a lower virtual trust level, and the lower virtual trust level being less privileged than the higher virtual trust level. A program running on the virtual processor 202 operating in a virtual trust level that is more privileged than another virtual trust level can restrict access to memory locations by programs or devices that are operating in that other virtual trust level. A program running on the virtual processor 202 can also optionally change memory access protections for the virtual trust level at which the virtual processor 202 is running. However, a program running on the virtual processor 202 operating in a virtual trust level that is less privileged than another virtual trust level cannot restrict access to memory locations by programs or devices that are operating in that other virtual trust level. In one or more embodiments, the virtual trust levels are labeled with integer values (e.g., 0, 1, 2, etc.), with virtual trust levels having larger integer values being higher level virtual trust levels than virtual trust levels having smaller integer values. Alternatively, virtual trust levels having smaller integer values can be higher level virtual trust levels than virtual trust levels having larger integer values, or other labeling techniques can be used (e.g., letters, other characters or symbols, and so forth).

In one or more embodiments, memory access protections are implemented on a per-page (per-memory page) basis. Each memory page has associated memory access protections, and the memory access protections for a memory page can be changed independently of the memory access protections of the other memory pages. The memory access protections are also made independent of any requirement that particular pages or ranges of contiguous addresses have the same memory access protections. Although reference is made herein to the memory access protections being implemented on a per-page basis, it should be noted that the memory access protections can alternatively be implemented in other groups or blocks of memory addresses, such as parts of memory pages, multiple memory pages, address ranges, and so forth.

Memory access protections for a virtual trust level can be changed in a variety of different manners. In one or more embodiments, the virtual secure mode module 124 exposes an interface (e.g., a function call) that is called by a program running on the virtual processor 202 to change the memory access protections for a virtual trust level, identifying the memory access protections that are to be changed. In response to the interface being called, the virtual secure module 124 changes the memory access protections as requested (assuming the change is for a lower (or optionally the same) virtual trust level).

The virtual processor 202 can run or operate in only one virtual trust level at any given time, and the virtual trust level that the processor 202 is running or operating in at a particular time is referred to as the active virtual trust level for the processor 202 at that particular time. The virtual processor 202 can switch from one virtual trust level to another in different manners, such as in response to a particular event (e.g., an interrupt, execution of a particular code sequence, and so forth).

Returning to FIG. 1, a physical processor that is a component 104 assigns a virtual machine memory space to a virtual processor that is a virtual component 116, and maintains an address translation table. The address translation table maps addresses in a virtual machine memory space that is assigned to the virtual machine 106 to addresses in a physical memory space (physical memory that is a component 104). Which address of the physical memory space a particular address in the virtual machine memory space maps to at any given time can change, and is controlled by a memory manager (e.g., part of the physical processor). The memory manager can change mappings, allowing multiple different virtual processors to share the physical memory space and/or allowing the virtual machine memory space to be larger than the physical memory space, using any of a variety of public and/or proprietary techniques.

The virtual secure mode module 124 maintains memory access protections for each memory page of the virtual machine memory space, identifying the memory access protections for each virtual trust level of each virtual processor in the virtual machine 106. The virtual secure mode module 124 can maintain the memory access protections for the memory pages in a variety of different manners. In one or more embodiments, the virtual secure mode module 124 maintains a table, list, or other record of the memory access protections for each virtual trust level of each virtual processor in the virtual machine 106. Alternatively, the virtual secure mode module 124 can maintain the memory access protections in other manners, such as part of the address translation table that maps addresses in the virtual machine memory space that is assigned to the virtual machine 106 to addresses in the physical memory space.

In one or more embodiments, a physical processor can support multiple virtual to physical translation layers. Each virtual machine can manage its own virtual to guest physical page mapping. The virtual machine manager manages the mapping from guest physical to true physical pages. Additionally, each virtual trust level can edit this final mapping to machine physical pages as it applies to any lower level virtual trust level.

Figure 3:
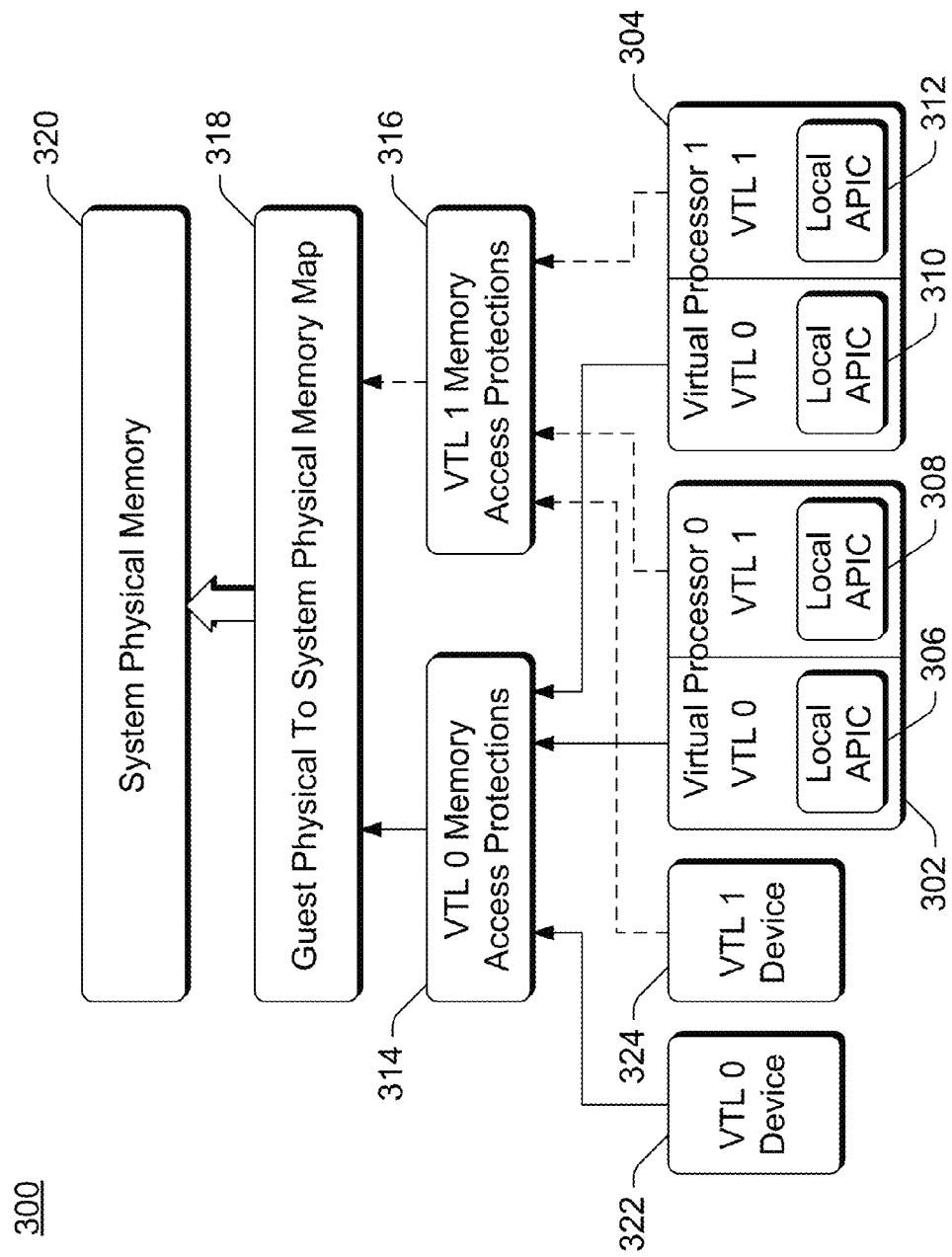
FIG. 3 illustrates an example system implementing multiple virtual trust levels in accordance with one or more embodiments.

FIG. 3 illustrates an example system 300 implementing multiple virtual trust levels in accordance with one or more embodiments. The example system 300 includes two virtual processors: virtual processor 302 and virtual processor 304. The virtual processors 302 and 304 can each be a virtual component 116 of FIG. 1 and/or a virtual processor 202 of FIG. 2.

The virtual processors 302 and 304 implement two different virtual trust levels referred to as VTL 0 and VTL 1. Each virtual trust level of each virtual processor has its own local interrupt subsystem, illustrated as advanced programmable interrupt controller (APIC) 306 (the interrupt controller for VTL 0 of the virtual processor 302), APIC 308 (the interrupt controller for VTL 1 of the virtual processor 302), APIC 310 (the interrupt controller for VTL 0 of the virtual processor 304), and APIC 312 (the interrupt controller for VTL 1 of the virtual processor 304). At any given time, the virtual processors 302 and 304 can be operating in the same or different virtual trust levels. Thus, multiple virtual processors can be running in different virtual trust levels concurrently.

The system 300 maintains a record of memory access protections 314 for VTL 0 as well as a record of memory access protections 316 for VTL 1. The virtual machine manager (e.g., the virtual secure mode module 124 of FIG. 1) maintains the memory access protections 314 and 316. For each access to an address of a memory page from virtual processor 302 or 304 when running in VTL 0, the virtual machine manager checks the VTL 0 access memory protections 314 for the memory page that includes the address being accessed. If the VTL 0 access memory protections 314 indicate the access is allowed, then a guest physical to system physical memory map 318 is used to map the address to a memory address of system physical memory 320, and the requested access is performed. The guest physical to system physical memory map 318 is, for example, the address translation table that maps addresses in the virtual machine memory space (guest physical addresses, or GPAs) to addresses in the physical memory space (system physical addresses, or SPAs) as discussed above. However, if the VTL 0 access memory protections 314 indicate that the access is not allowed, then the requested access is denied (is not performed). Because the requested access is denied, no mapping of the address to a memory address of the physical memory 320 need be performed.

Similarly, for each access to an address of a memory page from virtual processor 302 or 304 when running in VTL 1, the virtual machine manager checks the VTL 1 access memory protections 316 for the memory page that includes the address being accessed. If the VTL 1 access memory protections 316 indicate the access is allowed, then the guest physical to system physical memory map 318 is used to map the address to a memory address of the system physical memory 320, and the requested access is performed. However, if the VTL 1 access memory protections 316 indicate that the access is not allowed, then the requested access is denied (is not performed). Because the requested access is denied, no mapping of the address to a memory address of the physical memory 320 need be performed.

Various different memory access protections can be identified as memory access protections 314 and 316. For example, the memory access protections can include the following protections: No access (addresses on the memory page cannot be read, written, or executed); read-only, no execute (addresses on the memory page can be read, but cannot be written or executed); read-only, executable (addresses on the memory page can be read or executed, but cannot be written); read/write, no execute (addresses on the memory page can be read or written, but cannot be executed); and read/write, executable (addresses on the memory page can be read, written, or executed).

These different memory access protections support various different usage scenarios. For example, when running in VTL 1, the VTL 0 memory access protection for a memory page can be set to "no access". This setting puts the memory page in a "secure" mode, making the memory page inaccessible to programs running on the virtual processors 302 and/or 304 in VTL 0. By way of another example, when running in VTL 1, the VTL 0 memory access protection for a memory page can be set to "read-only, executable". This setting puts the memory page in a mode where it can be read and executed by programs running on the virtual processors 302 and/or 304 in VTL 0, but cannot be altered by programs running on the virtual processors 302 and/or 304 in VTL 0. Thus, various code integrity or other security programs can be stored in the memory pages in VTL 1, and run by programs in VTL 0 while being assured those programs running in VTL 0 cannot alter the programs.

Additional devices can also optionally be associated with a particular virtual trust level. Any additional devices that access memory pages (e.g., performing direct memory access (DMA)) can be associated with a virtual trust level. System 300 includes example devices 322 and 324. Device 322 is associated with VTL 0, and device 322 is allowed to access memory pages in accordance with VTL 0 memory access protections 314, analogous to virtual processors 302 and 304 running in VTL 0. Similarly, device 324 is associated with VTL 1, and device 324 is allowed to access memory pages in accordance with VTL 1 memory access protections 316, analogous to virtual processors 302 and 304 running in VTL 1.

In one or more embodiments, each device 322 and 324 is initialized to operate in the lowest virtual trust level (e.g., VTL 0). A virtual processor 302 or 304 can configure a device to be associated with the active VTL or optionally with any lower level VTL. A virtual processor 302 or 304 can configure a device to be associated with a particular VTL in various manners, such as by invoking a call (e.g., a function) exposed by the virtual machine manager 102.

The virtual secure mode module 124 of FIG. 1 maintains a record of which devices are associated with which virtual trust levels. The module 124 updates the record to reflect changes in which virtual trust levels are associated with which devices. The virtual secure mode module 124 also maintains a record of which virtual trust level each virtual processor 302 and 304 is operating in at any given time. The virtual processors 302 and 304 can switch from one virtual trust level to another in different manners, and each time such a switch occurs an indication of the virtual trust level switched to is included in the record maintained by the module 124.

In the illustrated example system 300, the memory access protections 314 and 316 for different virtual trust levels are implemented separately, and a common memory map 318 is shared by all of the virtual trust levels. Alternatively, the memory access protections 314 and 316 can be implemented as part of the memory map 318. In such situations, a single memory map 318 can be implemented that includes the memory access protections for all of the virtual trust levels, or alternatively separate memory maps (analogous to memory map 318), each memory map including the memory access protections for a different virtual trust level.

Figure 4:
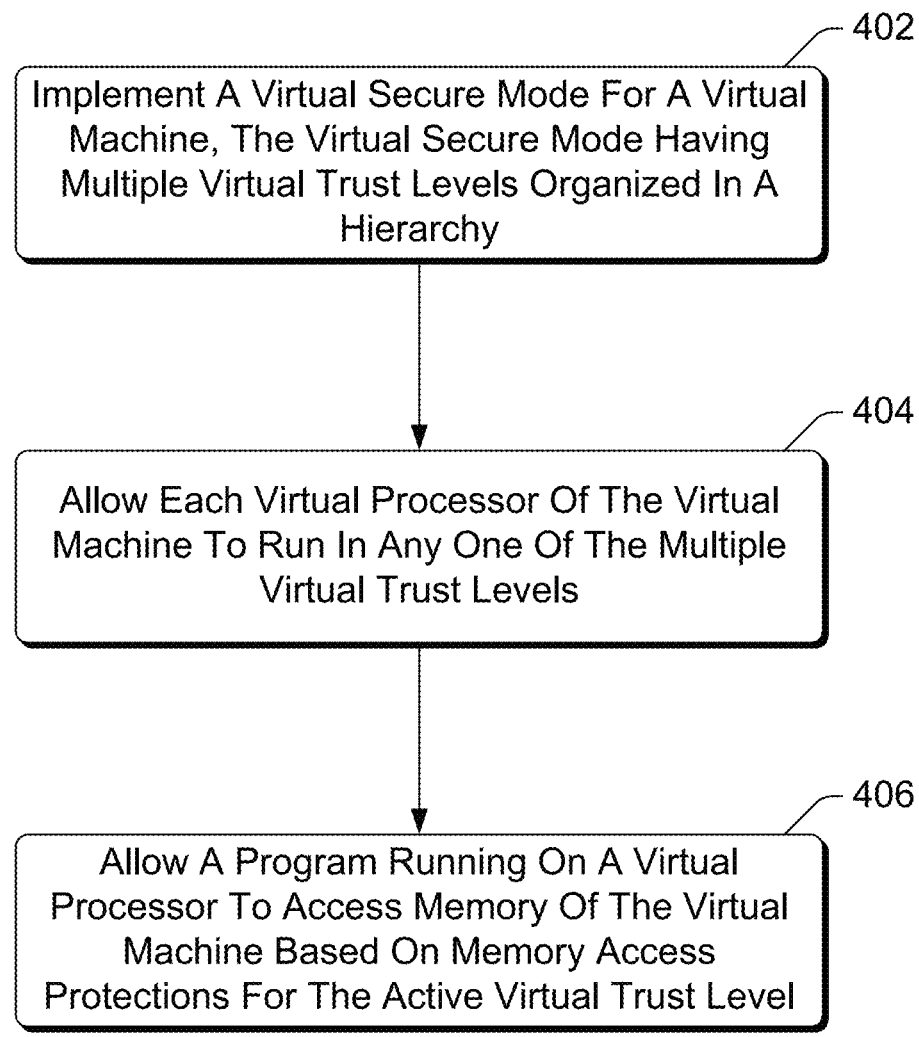
FIG. 4 is a flowchart illustrating an example process for implementing a virtual secure mode for virtual machines in accordance with one or more embodiments.

FIG. 4 is a flowchart illustrating an example process 400 for implementing a virtual secure mode for virtual machines in accordance with one or more embodiments. Process 400 is carried out by a virtual machine manager, such as virtual machine manager 102 of FIG. 1, and can be implemented in software, firmware, hardware, or combinations thereof. Process 400 is shown as a set of acts and is not limited to the order shown for performing the operations of the various acts. Process 400 is an example process for implementing a virtual secure mode for virtual machines; additional discussions of implementing a virtual secure mode for virtual machines are included herein with reference to different figures.

In process 400, a virtual secure mode for a virtual machine is implemented (act 402). The virtual secure mode has multiple virtual trust levels organized in a hierarchy so that higher virtual trust levels are more privileged than lower virtual trust levels. Programs running in a more privileged virtual trust level are able to change memory access protections for less privileged virtual trust levels. However, programs running in a less privileged virtual trust level are not able to change memory access protections for more privileged virtual trust levels.

Each virtual processor of the virtual machine is allowed to run in any one of the multiple virtual trust levels (act 404). The virtual trust level that a virtual processor is running in at any given time is referred to as the active virtual trust level, and the virtual processor can switch the virtual trust level in which the virtual processor is running in different manners as discussed in more detail below.

The virtual machine manager allows a program running on a virtual processor of a virtual machine to access memory of the virtual machine based on memory access protections for the active virtual trust level (act 406). The memory access protections can allow or disallow particular types of access, such as read, write, and/or execute access. The memory access protections can be implemented on a per-memory page basis as discussed above.

Returning to FIG. 1, in one or more embodiments the virtual processors of virtual machine 106 are initialized to run in a single virtual trust level, such as VTL 0. With only a single virtual trust level, the virtual machine 106 can also be referred to as virtual secure mode not being enabled for the virtual machine 106. In order to run in a higher virtual trust level, the virtual machine 106 is enabled for one or more higher virtual trust levels (also referred to as enabling the virtual secure mode for the virtual machine 106). After a higher virtual trust level is enabled, a program running in the higher virtual trust level can change the memory access protections for a lower virtual trust level.

In one or more embodiments, one or more higher virtual trust levels can be enabled for the virtual machine 106 at a variety of different times. For example, one or more higher virtual trust levels can be enabled for the virtual machine 106 during creation of the virtual machine 106 and/or booting of the virtual machine manager 102, after the virtual machine 106 has booted and has been running for a threshold amount of time (e.g., a number of minutes or hours), and so forth.

Figure 5:
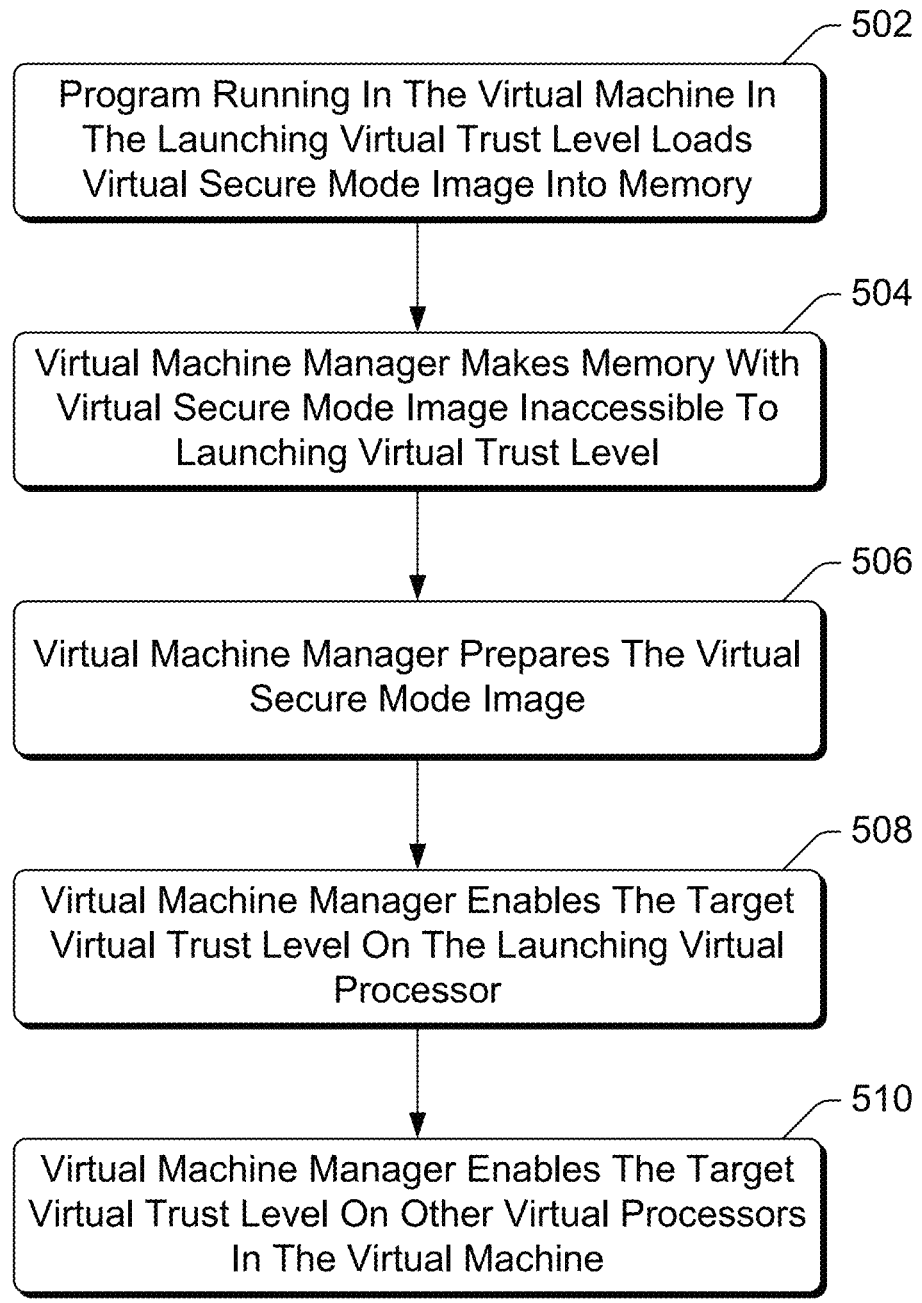
FIG. 5 is a flowchart illustrating an example process for enabling the virtual secure mode for a virtual machine in accordance with one or more embodiments.

FIG. 5 is a flowchart illustrating an example process 500 for enabling the virtual secure mode for a virtual machine in accordance with one or more embodiments. Process 500 is carried out by a program running in the virtual machine and a virtual machine manager, such as a program running in virtual machine 106 of FIG. 1 and virtual machine manager 102 of FIG. 1, and can be implemented in software, firmware, hardware, or combinations thereof. Process 500 is shown as a set of acts and is not limited to the order shown for performing the operations of the various acts. Process 500 is an example process for enabling the virtual secure mode for a virtual machine; additional discussions of enabling the virtual secure mode for a virtual machine are included herein with reference to different figures.

In process 500, a program running in the virtual machine loads a virtual secure mode image into memory (act 502). The program can be viewed as running in the lowest virtual trust level (even though the virtual secure mode is not yet enabled). The virtual trust level that the program is running in is also referred to as the launching virtual trust level. In one or more embodiments, the virtual secure mode image is loaded into memory by the program (which may be referred to as a virtual secure mode loader) copying into or otherwise placing the virtual secure mode image in memory pages of the virtual memory space of the virtual machine. The virtual secure mode image refers to code and data (e.g., object code that can be executed by a processor) that, when executed, implements the virtual secure mode.

The virtual machine manager is also notified (e.g. by the program that loads the virtual secure mode image) of the memory pages into which the virtual secure mode image is loaded. The virtual machine manager can be notified in different manners, such as by the virtual secure mode loader invoking a call exposed by the virtual machine manager (also referred to as a hypercall) and providing as a parameter of the hypercall an indication of the memory pages into which the virtual secure mode image is loaded. The hypercall can be, for example, an HvLoadVsmImage( ) hypercall.

In response to the notification of the memory pages into which the virtual secure mode image is loaded, the virtual machine manager makes those memory pages inaccessible to the launching virtual trust level (act 504). The virtual machine manager also makes those memory pages inaccessible to virtual trust levels (if any) that are a lower level than the launching virtual trust level. The memory pages can be made inaccessible in different manners, such as making the memory access protections for the memory pages "no access" for the launching virtual trust level (and any virtual trust levels that are a lower level than the launching virtual trust level).

Additionally, the virtual machine manager prepares the virtual secure mode image (act 506). Preparation of the virtual secure mode image refers to putting the virtual machine manager in a state to be able to execute and verify the virtual secure mode image. This preparation can include recording various internal state regarding the location (e.g., the memory pages) where the virtual secure mode image is stored, and also generating a hash value of the virtual secure mode image. Upon the first entry into a higher level virtual trust level after the higher level virtual trust level has been enabled on a virtual processor, the virtual processor is expected to be executing in a well-defined state. This allows assurance that the initial program or programs running in the higher level virtual trust level operate correctly. The initial program or programs that run in a higher level virtual trust level can use this information as they boot-strap their execution environment in the higher level virtual trust level.

The hash value of the virtual secure mode image can be generated using any of a variety of public and/or proprietary hashing functions, such as any of the Secure Hash Algorithm (SHA) family of hashing functions. The hash value can be a hash value of the virtual secure mode image across all memory pages, or alternatively a collection of the hash values of each of the memory pages into which at least part of the virtual secure mode image is loaded. The hash value can be used, for example, by the virtual machine manager to subsequently verify that the virtual secure mode image is not altered after being loaded into memory.

The virtual machine manager then enables the target virtual trust level on the launching virtual processor (act 508). The target virtual trust level refers to a virtual trust level higher than the launching virtual trust level. The launching virtual processor refers to the virtual processor running the virtual secure mode loader. In one or more embodiments, the virtual machine manager enables the target virtual trust level on the launching virtual processor in response to a hypercall exposed by the virtual machine manager being invoked by the virtual secure mode loader. The hypercall can be, for example, an HvEnableVtl( ) hypercall.

The virtual machine manager then enables the target virtual trust level on other virtual processors in the virtual machine (act 510). In one or more embodiments, the virtual machine manager enables the target virtual trust level on the other virtual processors in response to a hypercall exposed by the virtual machine manager being invoked by the virtual secure mode loader. The virtual secure mode loader can provide as a parameter of the hypercall an identifier of a virtual processor on which the target virtual trust level is to be enabled, or alternatively the hypercall can indicate to enable the target virtual trust level on all other virtual processors in the virtual machine. The virtual secure mode loader can also optionally provide an initial virtual processor context to use for the target virtual trust level of the other virtual processors on which the target virtual trust level is being enabled. The hypercall can be, for example, an HvEnableVtl( ) hypercall.

In embodiments in which three or more virtual trust levels are implemented, acts 508 and 510 can be repeated for each additional higher level virtual trust level to be enabled. For each higher level virtual trust level, the hypercalls exposed by the virtual machine manager are invoked by the virtual secure mode loader (or other program running in a virtual trust level lower than the target virtual trust level being enabled).

In one or more embodiments, each virtual trust level for a virtual machine can be enabled and disabled separately. A virtual trust level can be disabled on a processor by invoking a call of the virtual machine manager (e.g., a HvDisableVtlVp hypercall) that identifies a virtual processor on which the virtual trust level is to be disabled. The call is invoked by a virtual processor operating in the virtual trust level that is being disabled. In response to the call, the virtual machine manager disables that virtual trust level on the identified virtual processor. The virtual machine manager optionally triggers an exit to a lower virtual trust level on the identified virtual processor, so that the identified virtual processor is running in that lower virtual trust level.

Additionally, in one or more embodiments, all higher virtual trust levels for a virtual machine can be disabled, effectively removing the virtual secure mode for a virtual machine. The virtual secure mode can be removed from a virtual machine by disabling all but the lowest level virtual trust level on all but one virtual processor (referred to as the final virtual processor) of the virtual machine. Higher level virtual trust levels can be disabled on a processor by invoking a call of the virtual machine manager (e.g., a HvDisableVtlVp hypercall) that identifies a virtual processor on which the higher virtual trust levels are to be disabled. The call is invoked by a virtual processor operating in the higher virtual trust level that is being disabled. In response to the call, the virtual machine manager disables all but the lowest virtual trust level on the identified virtual processor.

All but the lowest level virtual trust level is then disabled on the final virtual processor of the virtual machine. The higher virtual trust levels are disabled by invoking a call of the virtual machine manager (e.g., a HvDisableVTL hypercall). The call is invoked by the final virtual processor operating in the higher virtual trust level that is being disabled. In response to the call, the virtual machine manager triggers an exit to the lowest level virtual trust level on the final virtual processor. At this point, all of the virtual processors in the virtual machine are running in the lowest level virtual trust level. The virtual secure mode image is then unloaded by invoking a call of the virtual machine manager (e.g., a HvUnloadVsm hypercall). In response to this call, all memory access protections are reverted to their original state, resulting in the memory pages being accessible to the lowest level virtual trust level, including memory pages storing the virtual secure mode image accessible (e.g., the memory that was made inaccessible in act 504)

Returning to FIG. 2, the virtual processor 202 can change the active virtual trust level in a variety of different manners. Switching or changing from a lower virtual trust level to a higher virtual trust level is also referred to as entering the higher virtual trust level, and switching or changing from a higher virtual trust level to a lower virtual trust level is also referred to as exiting the higher virtual trust level.

In one or more embodiments, the virtual processor 202 can switch or change from a lower virtual trust level to a higher virtual trust level in response to one or more events occurring, such as a virtual trust level call, an interrupt for a higher virtual trust level, a trap (e.g., to allow a higher virtual trust level to process certain types of faults, such as page faults, for lower virtual trust levels), or an intercept into a higher virtual trust level. A virtual trust level call refers to a particular one or more instructions (e.g., a particular sequence of instructions) being executed to transition from the current virtual trust level to a higher virtual trust level. An interrupt for a higher virtual trust level refers to receipt of an interrupt for (an interrupt targeting) a higher virtual trust level than the current virtual trust level. An intercept into a higher virtual trust level refers to an operation accessing a protected address or protected component of a higher virtual trust level, such as a register of a higher virtual trust level, an I/O port associated with a higher virtual trust level, or a memory page associated with a higher virtual trust level.

Some processor state of the virtual processor 202 is shared across different virtual trust levels, and is also referred to as shared processor state. The shared processor state need not change when changing the active virtual trust level, improving the efficiency of changing virtual trust levels. However, other processor state of the virtual processor 202 is not shared across different virtual trust levels, and is also referred to as private processor state. The private processor state, illustrated as virtual processor state 208, is changed when changing the active virtual trust level.

It should be noted that although when changing the active virtual trust level the shared processor state remains unchanged, programs running in a virtual trust level may have different policies regarding how they handle shared processor state depending on the reason why the virtual trust level became active. For example, if a virtual trust level becomes active due to a virtual trust level call, a program running in the newly active virtual trust level may not need to save the shared processor state, as programs in the previous virtual trust level (the virtual trust level that invoked the call to the newly active virtual trust level) can tolerate the shared processor state changing. However, if a virtual trust level becomes active due to an interrupt, programs running in the previous virtual trust level (the virtual trust level that was interrupted) likely cannot tolerate the shared processor state changing, as they are unaware that a virtual trust level change occurred. In this case, a program running in the newly active virtual trust level can save the shared processor state before changing the shared processor state, so that the program running in the newly active virtual trust level can restore the shared processor state upon completion of the interrupt processing (so that the previous virtual trust level can be resumed in its original state, making the interrupt transparent to programs running in the previous virtual trust level).

In one or more embodiments, the private processor state includes an instruction pointer (or program counter) register and a stack pointer register. The private processor state for the active virtual trust level is saved by the virtual machine manager when changing the active virtual trust level, and is replaced with the private processor state for the virtual trust level being changed to. The private processor state for the virtual trust level being changed to can be a default/initialization state (if the virtual trust level has not been previously entered), or the previously saved private processor state for the virtual trust level (saved prior to the virtual processor 202 last changing away from the virtual trust level).

In one or more embodiments, the virtual machine manager maintains for each virtual trust level 204 (other than a lowest level virtual trust level) a control page used for bi-directional communication between the virtual machine manager and programs running in the virtual trust level. The control page includes an indication of a reason why the virtual trust level was entered (e.g., the event that occurred that caused the higher virtual trust level to be entered), an indication of the previous virtual trust level (the active virtual trust level at the time that the event occurred to cause the higher virtual trust level to be entered), and optionally an indication of additional information describing or related to the event that occurred that caused the higher virtual trust level to be entered.

In one or more embodiments, the virtual processor 202 can switch from one virtual trust level to only the next higher virtual trust level. For example, the virtual processor 202 can switch from VTL 0 to VTL 1, from VTL 1 to VTL 2, from VTL 2 to VTL 3, and so forth, but not from VTL 0 to VTL 3. Alternatively, the virtual processor can switch from one virtual trust level to any higher virtual trust level. For example, in a virtual trust level call the virtual processor 202 can specify which higher virtual trust level is being switched to, allowing switching from VTL 0 to VTL 3.

After being switched from a lower virtual trust level to a higher virtual trust level, the virtual processor 202 can switch or change back to the lower virtual trust level (exit the higher virtual trust level) in response to a variety of different events. In one or more embodiments, the virtual processor 202 performs one or more actions (e.g., performing one or more operations, handling an interrupt, etc.) and then returns to the lower virtual trust level. The virtual processor 202 returns to the lower virtual trust level by executing a particular one or more instructions (e.g., a particular sequence of instructions) to transition from the current virtual trust level to a lower virtual trust level. These instructions are optionally stored on a memory page referred to as the virtual trust level exit code page, which allows the virtual machine manager to abstract the code sequence to switch virtual trust levels. In one or more embodiments, the virtual processor 202 returns to the lower virtual trust level from which the active virtual trust level was entered, although alternatively the virtual processor 202 can return to a different virtual trust level.

For shared processor state the processor state does not change when changing virtual trust levels, which allows for passing of information between virtual trust levels using the shared processor state. For private processor state, each virtual trust level has its own instance of the processor state (e.g., registers) that can be accessed only by that virtual trust level. The virtual machine manager manages saving and restoring such processor state (e.g., contents of registers) when switching between virtual trust levels. When entering a virtual trust level 204, the private processor state is the same (e.g., the registers contain the same values) as when the virtual processor 202 last ran in that virtual trust level 202.

In general, registers that are to be configured appropriately upon entry into a virtual trust level in order for code to execute in the virtual trust level are private processor state. A higher level virtual trust level is assured that it can reliably get execution control of a virtual processor in a well-defined state that cannot be altered by a lower level virtual trust level. Thus, key control registers and registers that are critical for controlling execution flow are private processor state for each virtual trust level. General purpose register state that does not directly alter code flow upon entry into a virtual trust level can be shared processor state or private processor state.

In one or more embodiments, general purpose registers, vector registers, and floating point registers are shared processor state, except for an instruction pointer (or program counter) register and a stack pointer register. The instruction pointer (or program counter) register and stack pointer register are private processor state. Control registers are also private processor state, except for a page fault register. The page fault register (e.g., the CR2 register for X64 architecture processors) is shared processor state.

Table I illustrates examples of registers that are shared processor state (listed as type "shared" in Table I), and examples of registers that are private processor state (listed as type "private" in Table I). The registers illustrated in Table I are examples for X64 architecture processors. It is to be appreciated that these registers are examples, that not all processor architectures include all of these registers, and that different processor architectures can include different (but optionally analogous) registers.

TABLE I

| Type | Registers |
|---|---|
| Shared | Rax, Rbx, Rcx, Rdx, Rsi, Rdi, Rbp |
|  | CR2 |
|  | R8-R15 |
|  | DR0-DR6 |
|  | XCR0 (XFEM) |
|  | X87 floating point state |
|  | XMM state |
|  | AVX state |
| Private | RIP, RSP |
|  | RFLAGS |
|  | CR0, CR3, CR4 |
|  | DR7 |
|  | IDTR, GDTR |
|  | CS, DS, ES, FS, GS, SS, TR, LDTR |
|  | TSC |

In one or more embodiments, the virtual machine manager also maintains various different machine state registers (MSRs), which are also referred to as virtual registers, some of which are shared processor state and some of which are private processor state. Table II illustrates examples of MSRs that are shared processor state (listed as type "shared" in Table II), and examples of MSRs that are private processor state (listed as type "private" in Table II). The registers in Table II that have the prefix "HV_X64" refer to registers in the Hyper-V® virtualization software available from Microsoft Corporation of Redmond, Wash., whereas the registers in Table II that do not have the prefix "HV_X64" refer to standard X64 architecture registers. The MSRs illustrated in Table II are examples for virtual machines running on X64 architecture processors. It is to be appreciated that these MSRs are examples, that not all virtual secure mode need include all of these MSRs, and that different processor architectures can include different (but optionally analogous) registers.

TABLE II

| Type | Registers |
| --- | --- |
| Shared | HV_X64_MSR_TSC_FREQUENCY |
| | HV_X64_MSR_VP_INDEX |
| | HV_X64_MSR_VP_RUNTIME |
| | HV_X64_MSR_RESET |
| | HV_X64_MSR_TIME_REF_COUNT |
| | HV_X64_MSR_GUEST_IDLE |
| | HV_X64_MSR_DEBUG_DEVICE_OPTIONS |
| | HV_X64_MSR_BELOW_1MB_PAGE |
| | HV_X64_MSR_STATS_PARTITION_RETAIL_PAGE |
| | HV_X64_MSR_STATS_VP_RETAIL_PAGE |
| | MTRR's |
| | MCG_CAP |
| | MCG_STATUS |
| Private | SYSENTER_CS, SYSENTER_ESP, SYSENTER_EIP, STAR, LSTAR, CSTAR, SFMASK, EFER, KERNEL_GSBASE, PAT, FS.BASE, GS.BASE |
| | HV_X64_MSR_HYPERCALL |
| | HV_X64_MSR_GUEST_OS_ID |
| | HV_X64_MSR_REFERENCE_TSC |
| | HV_X64_MSR_APIC_FREQUENCY |
| | HV_X64_MSR_EOI |
| | HV_X64_MSR_ICR |
| | HV_X64_MSR_TPR |
| | HV_X64_MSR_APIC_ASSIST_PAGE |
| | HV_X64_MSR_NPIEP_CONFIG |
| | HV_X64_MSR_SIRBP |
| | HV_X64_MSR_SCONTROL |
| | HV_X64_MSR_SVERSION |
| | HV_X64_MSR_SIEFP |
| | HV_X64_MSR_SIMP |
| | HV_X64_MSR_EOM |
| | HV_X64_MSR_SINT0-HV_X64_MSR_SINT15 |

Additionally, as discussed above, the virtual trust levels 204 have separate interrupt subsystems, with each virtual trust level 204 having its own interrupt subsystem 210. The separate interrupt subsystems 210 allow programs running in a virtual trust level to send inter-processor interrupts securely between virtual processors without interference from lower virtual trust levels. The separate interrupt subsystems 210 also allow the interrupt subsystem of a virtual trust level to securely receive interrupts from devices associated with that same virtual trust level without interference from programs in lower virtual trust levels. The separate interrupt subsystems 210 also allow each interrupt subsystem 210 to have a secure timer facility that cannot be interfered with by programs in lower virtual trust levels. The separate interrupt subsystems 210 also allow an interrupt subsystem 210 to receive notification upon receipt of interrupts for (interrupts targeting) a lower virtual trust level in order to allow for co-operative scheduling of interrupts between virtual trust levels.

For the active virtual trust level, interrupts can be received by the virtual machine manager for the active virtual trust level, for a higher virtual trust level than the active virtual trust level (unless the active virtual trust level is the highest virtual trust level for the virtual machine), or for a lower virtual trust level than the active virtual trust level (unless the active virtual trust level is the lowest virtual trust level for the virtual machine). In one or more embodiments, the interrupt includes an indication of the virtual trust level that the interrupt is for (that the interrupt targets). In response to receipt of an interrupt targeting the active virtual trust level, the interrupt subsystem 210 of the active virtual trust level handles the interrupt.

In response to receipt of an interrupt targeting a higher virtual trust level than the active virtual trust level, the virtual machine manager can take a variety of different actions. In one or more embodiments, an intercept control MSR (e.g., the HV_X64_MSR_VSM_INTERCEPT_CTL MSR) includes an interrupt VTL exiting setting that determines the action to take. If the interrupt VTL exiting setting has one value (e.g., indicating to always exit), then the virtual machine manager switches the active virtual trust level to the higher virtual trust level, and the interrupt subsystem 210 of the higher virtual trust level handles the interrupt. However, if the interrupt VTL exiting setting has another value (e.g., indicating to check interruptibility), then the virtual machine manager switches the active virtual trust level to the higher virtual trust level only if a processor state of the higher virtual trust level indicates that the higher virtual trust level can be interrupted. Alternatively, the interrupt VTL exiting setting can be maintained in other locations, such as a control page of the active virtual trust level (or of the higher virtual trust level).

Alternatively, the action to take can be determined in different manners. For example, the virtual machine manager can provide a mechanism to allow a higher virtual trust level to designate specific interrupt vectors that will trigger a switching of the active virtual trust level to the higher virtual trust level for handling of the interrupt by the interrupt subsystem 210 of the higher virtual trust level. Alternatively, various different state criteria can be applied by the virtual machine manager, and the virtual machine manager can switch the active virtual trust level to the higher virtual trust level for handling of the interrupt by the interrupt subsystem 210 of the higher virtual trust level only if the state criteria are satisfied by the active virtual trust level.

In response to receipt of an interrupt targeting a lower virtual trust level than the active virtual trust level, the virtual machine manager maintains a record of the interrupt for subsequent delivery to the interrupt subsystem 210 of the lower virtual trust level. In one or more embodiments, the interrupt does not pre-empt operation of the virtual processor 202 in the active virtual trust level. Rather, the virtual machine manager provides the interrupt to the interrupt subsystem 210 of the lower virtual trust level when the virtual processor 202 next switches to operating in that lower virtual trust level.

It should be noted that situations can arise in which it is desirable for a higher virtual trust level to be notified when a lower virtual trust level is sent an interrupt. This could be desirable, for example, in situations where a program of the higher virtual trust level desires to allow the virtual processor to return to the lower virtual trust level to handle an interrupt. In one or more embodiments, an interrupt notification facility is provided to facilitate notifying a higher virtual trust level when a lower virtual trust level is sent an interrupt. This interrupt notification facility can be provided in different manners, such as a control MSR (e.g., an HV_X64_MSR_VTL_CTL MSR). This interrupt notification facility can prevent a higher virtual trust level from delaying the interrupt processing for a lower virtual trust level for a long period of time.

When using the interrupt notification facility, in response to receipt of an interrupt targeting a lower virtual trust level than the active virtual trust level, the virtual machine manager evaluates the private processor state and state of the interrupt subsystem 210 of the lower virtual trust level to determine if the interrupt can be presented to the interrupt subsystem 210 of the lower virtual trust level. If, due to various private processor state or interrupt subsystem 210 state, the interrupt cannot be presented to the lower virtual trust level interrupt subsystem 210, then the interrupt is marked as pending and no further action on the interrupt is taken. However, if the interrupt can be presented to the lower virtual trust level interrupt subsystem 210, then the virtual machine manager maintains a record of the interrupt for subsequent delivery to the interrupt subsystem 210 of the lower virtual trust level as discussed above, and generates an interrupt at the active virtual trust level. The interrupt generated at the active virtual trust level (e.g., an interrupt to an interrupt vector specified in the HV_X64_MSR_VTL_CTL MSR) results in a program running at the active virtual trust level deciding how to the respond to the interrupt. The program can have the virtual machine manager exit the higher virtual trust level, allowing the lower virtual trust level to handle the interrupt targeting the lower virtual trust level. However, the virtual machine manager need not exit the higher virtual trust level, or the program can delay having the virtual machine manager exit the higher virtual trust level for various amounts of time.

Additionally, as discussed above, the virtual machine manager can switch to a higher virtual trust level in response to an intercept into the higher virtual trust level. In one or more embodiments, the virtual machine manager allows a higher virtual trust level to specify particular resources or components that are locked and inaccessible to programs in lower virtual trust levels. The virtual machine manager can allow the higher virtual trust level to lock and make inaccessible, for example, particular input/output (I/O) port access controls, MSR access controls, memory access controls, and/or control registers. The higher virtual trust level can specify (e.g., via various MSR settings or in other manners), which particular I/O port access controls, MSR access controls, memory access controls, and/or control registers are locked. In response to an attempt being made (e.g., by a program or device) to access a resource or component locked by a higher virtual trust level, an intercept into the higher virtual trust level is generated. In response to the intercept, the virtual machine manager switches the virtual processor to the higher virtual trust level (or alternatively to a highest virtual trust level supported by the virtual processor).

The higher virtual trust level is able to respond to the intercept in a variety of different manners. For example, a program in the higher virtual trust level can consider the access fatal and trigger some indication of failure. By way of another example, a program in the higher virtual trust level can emulate access to the resource or component. In order to enable such emulation, the virtual machine manager provides hypercalls that can be used to manipulate the context of the lower virtual trust level that resulted in the intercept. By way of another example, a program in the higher virtual trust level can proxy execution of access to the resource or component. By way of yet another example, a program in the higher virtual trust level can reflect a secure intercept to a lower virtual trust level.

In one or more embodiments, in situations in which the virtual processor 202 includes three or more virtual trust levels, rather than supporting nesting of secure intercept facilities the virtual machine manager provides a single set of access control MSRs that are shared across all the virtual trust levels. Programs in the virtual trust levels that desire to use the access control MSRs can cooperate using their own defined interfaces, or alternatively a program in the highest virtual trust level can emulate support of the intercept facilities to lower virtual trust levels (e.g., the higher virtual trust level injecting a secure intercept into a lower virtual trust level). Alternatively, nesting of secure intercept facilities can be supported by the virtual machine manager, and separate access control MSRs can be used for different virtual trust levels.

Various different MSRs are supported by the virtual machine manager. The following are examples of several MSRs that can be supported by the virtual machine manager. Specific fields for the MSRs are listed. It is to be appreciated, however, that these MSRs are examples, and that other registers, bit layouts for registers, fields, and so forth can alternatively be used.

Table III illustrates an example of an HV_X64_MSR_VTL_CTL MSR, which is available for each higher virtual trust level (all but the lowest level virtual trust level) on each virtual processor. Each higher virtual trust level has its own instance of the HV_X64_MSR_VTL_CTL MSR, except for VTL 0. The HV_X64_MSR_VTL_CTL MSR controls various attributes of how the VSM operates for the higher virtual trust level.

TABLE III

| Field | Description |
| --- | --- |
| Control Page | Identifies the guest physical memory page number of the virtual secure mode control page. |
| Interrupt Notification Assist | Identifies the interrupt vector to invoke in the active VTL when a lower VTL receives a presentable interrupt. A presentable interrupt refers to an interrupt that can actually |
| Vector | be presented to the lower VTL (and is not currently blocked by that environment). |

Table IV illustrates an example of an HV_X64_MSR_VTL_CALL MSR, which is used to identify a GPA page on which to map the VTL call code page. The HV_X64_MSR_VTL_CALL MSR is shared across the virtual machine. There is one instance of the HV_X64_MSR_VTL_CALL MSR in a virtual machine for each virtual trust level (except for the highest virtual trust level). When the HV_X64_MSR_VTL_CALL MSR is enabled, the address specified in the Code Page GPA field is overlaid with the virtual trust level call code page (the control page used for bi-directional communication between the virtual machine manager and programs running in the virtual trust level as discussed above).

TABLE IV

| Field | Description |
| --- | --- |
| Code Page GPA | Guest physical page number of where to map the VTL call code page. |
| Non-Privileged Access | If set to one value (e.g., 1), allows non-privileged (all but the lowest virtual trust level) programs to initiate a VTL call; If set to another value (e.g., 0), attempts to initiate a VTL call by non-privileged programs result in an exception. |
| Mapped | Indicates if the VSM call code page is mapped (enabled). |

Table V illustrates an example of an HV_X64_MSR_VTL_STATUS MSR, which provides information about the virtual trust level status of a virtual processor. The HV_X64_MSR_VTL_STATUS MSR is for an individual virtual processor, and there is one instance of the HV_X64_MSR_VTL_STATUS MSR per virtual trust level of the virtual processor.

TABLE V

| Field | Description |
| --- | --- |
| VTL + 1 Partition Status | Indicates the current virtual machine status of the next higher virtual trust level. |
| VTL + 1 Enabled | Indicates if the next higher virtual trust level is enabled for the virtual processor. |
| Current VTL | Indicates the current virtual trust level of the virtual processor. |

Table VI illustrates an example of an HV_X64_MSR_VTL_EXIT MSR, which is used to identify a GPA page on which to map the virtual trust level exit code page. The HV_X64_MSR_VTL_EXIT MSR is shared across the virtual machine. There is one instance of the HV_X64_MSR_VTL_EXIT MSR in a virtual machine for each virtual trust level (except for the lowest virtual trust level). When the HV_X64_MSR_VTL_EXIT MSR is enabled, the address specified in the VTL Exit Code Page GPA field is overlaid with the virtual trust level exit code page.

TABLE VI

| Field | Description |
| --- | --- |
| VTL Exit Code Page GPA | Guest physical page number of where to map the VTL exit code page. |
| Mapped | Indicates if the VSM exit code page is mapped (enabled). |

Table VII illustrates an example of an HV_X64_MSR_VSM_INTERCEPT_CTL MSR, which controls what types of intercepts will trigger an entry into a higher virtual trust level. The HV_X64_MSR_VSM_INTERCEPT_CTL MSR is for an individual virtual processor, and is shared by the virtual trust levels of the virtual processor (although the HV_X64_MSR_VSM_INTERCEPT_CTL MSR is not available in the lowest virtual trust level).

TABLE VII

| Field | Description |
| --- | --- |
| Secure Interrupt VTL Exiting | Determines the behavior when an interrupt is received that is targeted at a higher virtual trust level. One value (e.g., 0) indicates to always exit, another value (e.g., 1) indicates to conditionally exit (indicating to check interruptibility). |
| GPA Exception | Determines if GPA access violations in a lower virtual trust level are to be intercepted and cause an entry into a higher virtual trust level. |
| MSR Access | Determines if accesses to MSRs in a lower virtual trust level are to be intercepted and cause an entry into a higher virtual trust level. If this is enabled (e.g., set to 1), the specific MSRs that trigger intercepts are determined by the setting of the HV_X64_MSR_VSM_MSR_CTL_MSR. |
| I/O Port | Determines if accesses to I/O ports in a lower virtual trust level are to be intercepted and cause an entry into a higher virtual trust level. If this is enabled (e.g., set to 1), the specific I/O ports that trigger intercepts are determined by the setting of the HV_X64_MSR_VSM_IOPORT_CTL0_MSR and of the HV_X64_MSR_VSM_IOPORT_CTL1_MSR. |

Table VIII illustrates an example of an X64_MSR_VSM_IOPORT_CTL MSR, which controls control which I/O port accesses trigger an intercept into the highest (or a higher) virtual trust level. Two HV_X64_MSR_VSM_IOPORT_CTL MSRs can be included, having the same fields and referred to as the HV_X64_MSR_VSM_IOPORT_CTL0 MSR and the HV_X64_MSR_VSM_IOPORT_CTL1 MSR. These two MSRs are for an individual virtual processor, and each is shared by the virtual trust levels of the virtual processor (although these two MSRs are not available in the lowest virtual trust level).

TABLE VIII

| Field | Description |
| --- | --- |
| I/O Port Control Page GPA | Contains the guest physical memory page number of the guest page containing an I/O port intercept control bitmap (used by the higher virtual trust level to specify which particular I/O port access controls are locked). |
| Enable | Enables the I/O port intercept control bitmap page. |

Table IX illustrates an example of an HV_X64_MSR_VSM_MSR_CTL MSR, which controls which MSR accesses trigger an intercept into a higher virtual trust level. The HV_X64_MSR_VSM_MSR_CTL MSR is for an individual virtual processor, and is shared by the virtual trust levels of the virtual processor (although the HV_X64_MSR_VSM_MSR_CTL MSR is not available in the lowest virtual trust level).

TABLE IX

| Field | Description |
| --- | --- |
| MSR Control Page GPA | Contains the guest physical memory page number of the guest page containing an MSR intercept control bitmap (used by the higher virtual trust level to specify which particular MSRs are locked). |
| Enable | Enables the MSR intercept control bitmap page. |

It should be noted that one aspect of the techniques discussed herein is that a higher virtual trust level cannot be pre-empted by a lower virtual trust level. Thus, when a virtual processor is running at a higher virtual trust level, the only way the virtual processor can switch to a lower virtual trust level is when software voluntarily switches to the lower virtual trust level by performing a VTL exit. No external events (e.g., interrupts, etc.) can trigger an automatic switch from a higher virtual trust level to a lower virtual trust level.

It should further be noted that the virtual trust levels implemented using the techniques discussed herein are independent of any protection rings or other protection mechanisms implemented by physical processors of the computing device 100. The techniques discussed herein are independent of the physical processor architecture, and thus can be implemented across any number of different processor architectures. Furthermore, the techniques discussed herein can support any number of virtual trust levels, including different numbers of virtual trust levels for different virtual processors in the same and/or different virtual machines.

It should also be noted that one or more virtual processors of the computing device 100 can support execution of code in multiple different modes, including at least a kernel mode (also referred to as kernel-mode, supervisor mode, or supervisor-mode) and a user mode (also referred to as user-mode). The techniques discussed herein are independent of any such mode that code is being executed in a virtual processor. The memory access protections discussed herein are applied based on the virtual trust level that the virtual processor is operating in, and are applied regardless of whether the virtual processor is executing code in kernel mode or user mode. Thus, even if a virtual processor is executing code in kernel mode, the memory access protections for a virtual trust level can only be changed by the virtual secure mode module based on the active virtual trust level as discussed above (whether the virtual processor is executing in kernel mode or user mode is irrelevant). Although additional protections may be provided by the virtual processor based on the mode (e.g., user or kernel) in which it is executing code, those protections are independent of the memory access protections discussed herein that are applied based on the virtual trust level.

Thus, the techniques discussed herein provide an environment that is more privileged than an operating system running in kernel mode. For example, when running in VTL 1, the VTL 0 memory access protection for a memory page can be set to "no access", and data or code can be stored in the memory page. This setting puts the memory page in a "secure" mode, making the memory page inaccessible to programs running in VTL 0. Thus, even if the operating system is running in kernel mode, the data or code stored in the memory page is inaccessible to the operating system if the operating system is running in VTL 0.

However, the techniques discussed herein can be used in conjunction with virtual processors supporting different modes of execution or protection rings. For example, a virtual processor can have its own kernel mode and user mode in VTL 1, and have its own kernel mode and user mode in VTL 0. Thus, an address space in VTL 1 cannot access another in VTL 1 unless allowed to do so by the VTL 1 kernel mode. However, VTL 0 kernel mode still cannot access any address space in VTL 1 (assuming the memory pages of the address space in VTL 1 have been marked as such).

Figure 6:
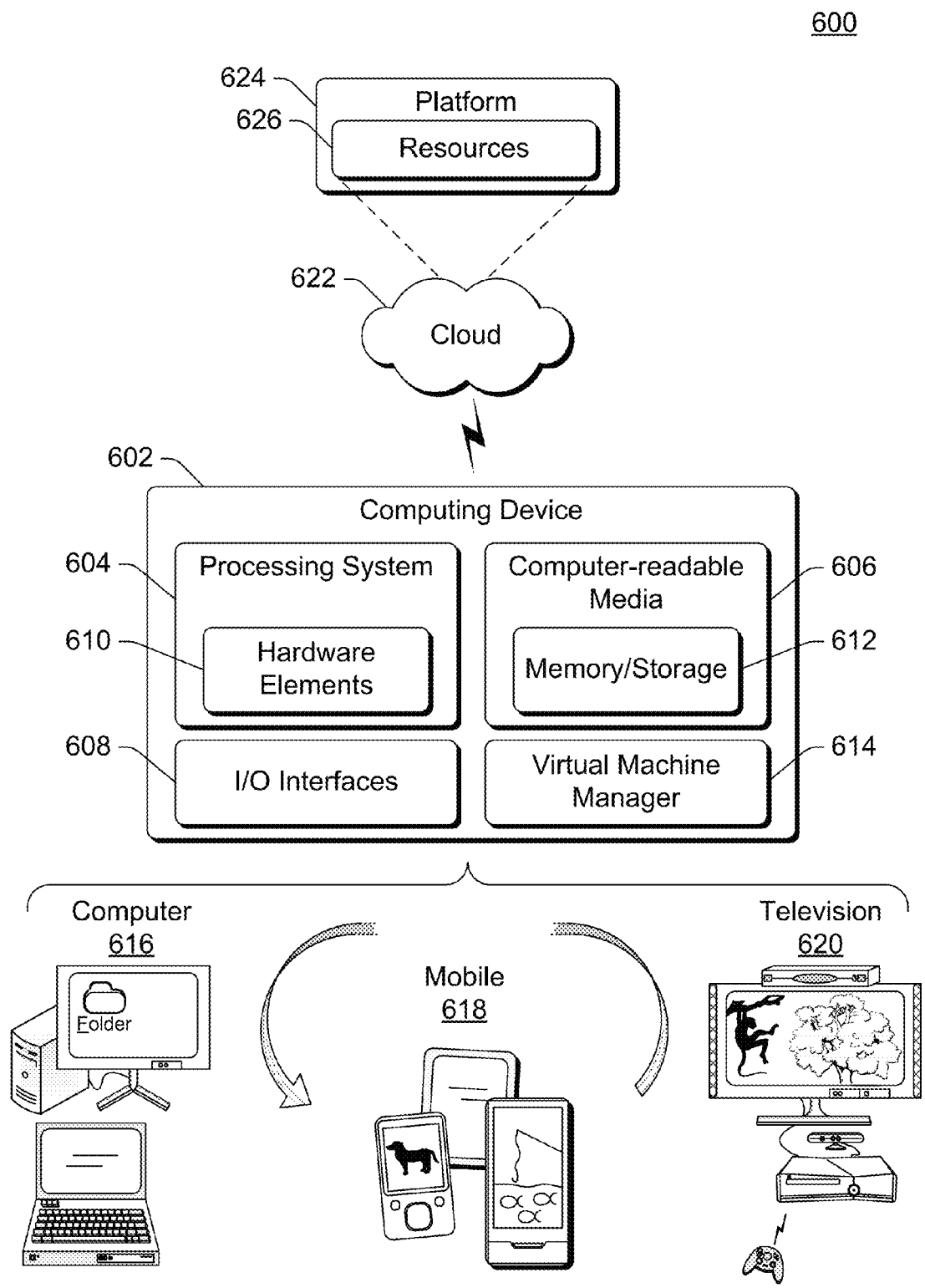
FIG. 6 illustrates an example system generally that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Computing device 602 also includes a virtual machine manager 614 (also referred to as a hypervisor). Virtual machine manager 614 allows a virtual machine to run on computing device 602. Virtual machine manager 614 can be, for example, virtual machine manager 102 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   implementing, for a virtual machine, a virtual secure mode having multiple virtual trust levels, the multiple virtual trust levels being organized as a hierarchy so that a higher level virtual trust level is more privileged than a lower virtual trust level, each virtual trust level having memory access protections associated with the virtual trust level that are separate from memory access protections of other of the multiple virtual trust levels, each virtual trust level having an interrupt subsystem associated with the virtual trust level that is separate from interrupt subsystems of other of the multiple virtual trust levels, and each virtual trust level having private processor state associated with the virtual trust level that is separate from private processor state of other of the multiple virtual trust levels;
   allowing a virtual processor of the virtual machine to run in any one of the multiple virtual trust levels, the virtual processor running in only one virtual trust level at a time, and the virtual trust level at which the virtual processor is running being an active virtual trust level; and
   allowing, by a virtual machine manager managing the virtual machine, a program running on the virtual processor to access memory of the virtual machine based on memory access protections configured for the active virtual trust level.

2. A method as recited in claim 1, the multiple virtual trust levels comprising two virtual trust levels, the higher level virtual trust level comprising a secure mode and the lower virtual trust level comprising a normal mode.

3. A method as recited in claim 1, the allowing the program to access memory comprising:
   receiving a request for a particular type of access to a memory address, the particular type of access comprising read access, write access, or execute access;
   checking whether memory access protections for the active virtual trust level for one of multiple memory pages that includes the memory address indicate that the particular type of access is allowed; and
   allowing the program to perform the particular type of access to the memory address only in response to the memory access protections for the active virtual trust level for the one memory page indicating that the particular type of access is allowed.

4. A method as recited in claim 1, further comprising:
   allowing, by the virtual machine manager, a program running while the virtual processor is operating in the higher virtual trust level to change memory access protections for the lower virtual trust level; and
   preventing, by the virtual machine manager, a program running while the virtual processor is operating in the lower virtual trust level from changing memory access protections for the higher virtual trust level.

5. A method as recited in claim 1, further comprising switching the active virtual trust level from the lower virtual trust level to the higher virtual trust level in response to a particular sequence of instructions being executed.

6. A method as recited in claim 1, further comprising switching the active virtual trust level from the lower virtual trust level to the higher virtual trust level in response to receipt of an interrupt targeting the higher virtual trust level.

7. A method as recited in claim 1, further comprising switching the active virtual trust level from the lower virtual trust level to the higher virtual trust level in response to an operation accessing a protected address or protected component of the higher virtual trust level.

8. A method as recited in claim 1, the active virtual trust level comprising the higher virtual trust level, the method further comprising notifying a program of the active virtual trust level when an interrupt is received for the lower virtual trust level.

9. A method as recited in claim 1, further comprising allowing, by the virtual machine manager, an additional device that performs direct memory access to access the memory based on the memory access protections configured for the one of the multiple virtual trust levels at which the additional device is running.

10. A computing device comprising:
    one or more processors;
    an operating system; and
    a virtual machine manager implementing a virtual secure mode having multiple virtual trust levels, the multiple virtual trust levels being organized as a hierarchy so that a higher level virtual trust level is more privileged than a lower virtual trust level, each virtual trust level having memory access protections associated with the virtual trust level that are separate from memory access protections of other of the multiple virtual trust levels, each virtual trust level having an interrupt subsystem associated with the virtual trust level that is separate from interrupt subsystems of other of the multiple virtual trust levels, and each virtual trust level having private processor state associated with the virtual trust level that is separate from private processor state of other of the multiple virtual trust levels, the virtual machine manager allowing, for each of one or more virtual processors, the virtual processor to run in any one of the multiple virtual trust levels and to access physical memory based on memory access protections configured for the one of the multiple virtual trust levels at which the virtual processor is running, the one of the multiple virtual trust levels at which the virtual processor is running being an active virtual trust level.

11. A computing device as recited in claim 10, the one or more virtual processors comprising multiple virtual processors, and each of the multiple virtual processors running in different virtual trust levels concurrently.

12. A computing device as recited in claim 10, the memory access protections comprising memory access protections for each of multiple memory pages of a virtual memory space mapped to the physical memory.

13. A computing device as recited in claim 12, the allowing each of one or more virtual processors to access physical memory comprising:
    receiving a request for a particular type of access to a memory address that maps to the physical memory, the particular type of access comprising read access, write access, or execute access;
    checking whether memory access protections for the active virtual trust level for one of the multiple memory pages that includes the memory address indicate that the particular type of access is allowed; and allowing the program to perform the particular type of access to the memory address only in response to the memory access protections for the active virtual trust level for the one memory page indicating that the particular type of access is allowed.

14. A computing device as recited in claim 10, the active virtual trust level comprising a lower virtual trust level of the multiple virtual trust levels, and the virtual machine manager further preventing a program running while the virtual processor is in the active virtual trust level from changing memory access protections for a higher virtual trust level of the multiple virtual trust levels.

15. A computing device as recited in claim 14, the virtual machine manager further switching the active virtual trust level of the virtual processor from the lower virtual trust level to the higher virtual trust level in response to receipt of an interrupt targeting the higher virtual trust level.

16. A computing device as recited in claim 14, the virtual machine manager further switching the active virtual trust level of the virtual processor from the lower virtual trust level to the higher virtual trust level in response to an operation accessing a protected address or protected component of the higher virtual trust level.

17. A computing device as recited in claim 10, the computing device further having one or more additional devices that perform direct memory access, the virtual machine manager further allowing, for each of the one or more additional devices, the additional device to access the physical memory based on the memory access protections configured for the one of the multiple virtual trust levels at which the additional device is running.

18. A computing device comprising a computer-readable storage medium storing computer-executable instructions that, when executed by one or more processors of the computing device, perform operations comprising:
    implementing, for a virtual machine, a virtual secure mode having multiple virtual trust levels, the multiple virtual trust levels being organized as a hierarchy so that a higher level virtual trust level is more privileged than a lower virtual trust level, each virtual trust level having memory access protections associated with the virtual trust level that are separate from memory access protections of other of the multiple virtual trust levels, each virtual trust level having an interrupt subsystem associated with the virtual trust level that is separate from interrupt subsystems of other of the multiple virtual trust levels, and each virtual trust level having private processor state associated with the virtual trust level that is separate from private processor state of other of the multiple virtual trust levels;

allowing a virtual processor of the virtual machine to run in any one of the multiple virtual trust levels, the virtual processor running in only one virtual trust level at a time, the virtual trust level at which the virtual processor is running being an active virtual trust level; and allowing, by a virtual machine manager managing the virtual machine, a program running on the virtual processor to access memory of the virtual machine based on the memory access protections associated with the active virtual trust level.

19. A computing device as recited in claim 18, the active virtual trust level comprising a lower virtual trust level of the multiple virtual trust levels, and the virtual machine manager further preventing a program running while the virtual processor is in the active virtual trust level from changing memory access protections for a higher virtual trust level of the multiple virtual trust levels.

20. A computing device as recited in claim 19, the virtual machine manager further switching the active virtual trust level of the virtual processor from the lower virtual trust level to the higher virtual trust level in response to receipt of an interrupt targeting the higher virtual trust level.

* * * * *